United States Patent [19]
Boyer

[11] Patent Number: 5,112,156
[45] Date of Patent: May 12, 1992

[54] TOOL HANDLE/EXTENSION COUPLER

[76] Inventor: Richard L. Boyer, 9277 W. Maryland Pl., Lakewood, Colo. 80232

[21] Appl. No.: 694,484

[22] Filed: May 2, 1991

[51] Int. Cl.$^5$ ................................................. B25G 3/00
[52] U.S. Cl. .................................... 403/287; 403/299; 403/361
[58] Field of Search ............... 403/342, 301, 299, 287, 403/361; 16/115; 15/145

[56] References Cited

U.S. PATENT DOCUMENTS

| | | | |
|---|---|---|---|
| 3,004,362 | 10/1961 | Day | 403/361 X |
| 3,682,516 | 8/1972 | Savage | 15/145 X |
| 4,132,489 | 1/1979 | Berg, Jr. et al. | 16/115 X |
| 4,642,837 | 2/1987 | Nichols et al. | 15/145 X |
| 4,663,796 | 5/1987 | Helling et al. | 15/145 X |
| 4,926,522 | 5/1990 | Wang | 16/115 X |

FOREIGN PATENT DOCUMENTS 1249452 11/1960 France ................................ 403/299

Primary Examiner—Andrew V. Kundrat
Attorney, Agent, or Firm—Joseph C. Herring

[57] ABSTRACT

Couplers for hand tools and extension handles are made up of two one piece fittings. Each fitting has an attachment element for connection to one of the tool and extension handle and a connecting element for joining the two fittings. Normally, one of the attachment elements will be a threaded male element and the other a threaded female element. The connector elements also are composed of a male and female element. The male connector element is a tube or rod with a dually tapered flange. The flange fits into a channel (depression) in the female connector element. The connecting elements are complementary in shape and size.

3 Claims, 2 Drawing Sheets

TOOL HANDLE/EXTENSION COUPLER

BACKGROUND OF THE INVENTION

Quick connect couplers have been used for a variety of purposes as shown by the following references. Each coupler design appears to be influenced by the end use utility.

Hand tool quick release couplers for a tool or frame and an extension handle are subjected to torque and lateral stresses. For example, painters working with rollers force the ends of the rollers against the ceiling-/wall juncture to reduce the need for trim painting. They may paint a gutter with only a portion of a roller or use a roller which is not perpendicular to the handle. They may paint woven surfaces or press down to exhaust the final dabs of paint from the roller when they are running out of paint. All these activities place considerable stress on the coupler.

Further, the painter may work in close quarters with a high ceiling and need to switch quickly between the use of a short handle and one or more extension handles. With the modern insistence on productivity, newer approaches to couplers are necessary.

U.S. Pat. No. 4,663,796 issued to L. L. and M. M. Helling describes a handle, including a female member which is coupled with a male member attached to a tool. The male member includes a pointed projection with a groove into which ball bearings can fit. The female member utilizes a spring to force ball bearings in a locking mechanism into the groove and complete the coupling.

U.S. Pat. No. 4,132,489 issued to A. T. Berg Jr. teaches a quick release coupler for handle extensions shaped so that two ends of extensions are forced into the ends of the coupler. Latch mechanisms which fit into notches in the handle are the primary fasteners.

There are other types of couplers which do not undergo the stress exerted on tool and extension couplers. Examples, some complex, are described below:

U.S. Pat. No. 4,128,264 issued to W. G. Oldford teaches a quick release, rotatable fitting for fluid transmission tubing in which a male element with a terminal flange and cruciform slots is utilized as a locking element.

U.S. Pat. No. 3,887,222 issued to H. H. Hammond teaches a fluid transmission tubing coupling with a push-pull release. A male element stop ring is utilized to compress a female element compressible lock ring to enable the insertion of the male element. A cam, activated by further male element pressure, compresses the lock ring for separation of the elements.

U.S. Pat. No. 3,245,703 issued to R. S. Manley teaches a quick release pipe, e.g. garden hose, coupling with manually compressible latches as a locking mechanism.

U.S. Pat. No. 2,327,951 issued to J. Zaleske teaches a quick connect, rotating or nonrotating coupling for rods, tubes, etc passing through aircraft fire walls, etc. The device utilizes male and female members. The resilient female member is slotted and has internal groove into which an annular enlargment on the male member is forced. A nonflexible sleeve slides over the seated combination to lock the members together and is retracted to enable the male member to be retracted. The inclusion of projections on the male member which fit in the slots of the female member eliminates rotation of the elements.

SUMMARY OF THE INVENTION

A quick release coupling for joining tools and tool handle extensions is made up of two fittings. The one-piece fittings have two components, that is, an attachment element for connecting the fittings to one of the tool and the extension handle and a connector element that is one of a flexible male and nonflexible female connector for connecting the fittings to each other.

The attachment elements are preferably threaded and sized to be screwed into the female and male elements of the tool and extension handle. The flexible male connector is slotted and has axially disposed, dually tapered flanges. The female connector is complementary in shape to the male member and sized to prevent substantial movement of the male member while seated.

DETAILED DESCRIPTION OF THE FIGURES

Figure 1:
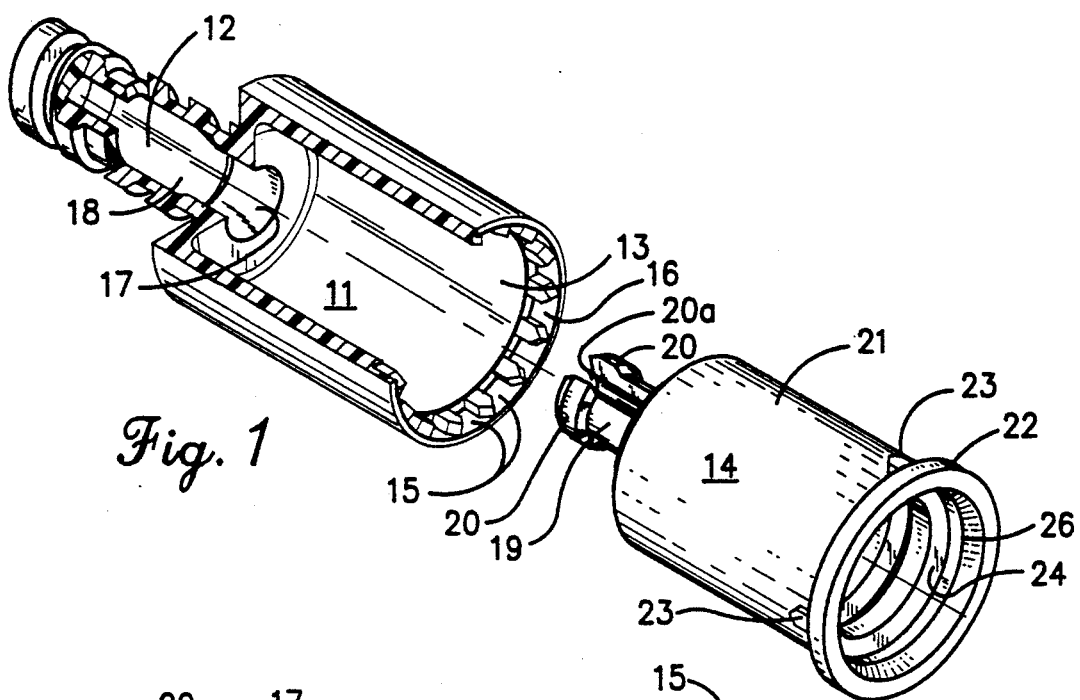
FIG. 1 is a partially cutaway perspective view of the two fittings making up a coupling.

FIG. 1 depicts a quick release coupling for the use with a paint roller. The coupling includes a fitting 11 with a hollow, externally threaded male attachment element 12 at one end for attachment to the handle of a paint roller frame. Female connector element 13 is on the other end of the fitting. A second fitting 14 is pushed into connector element 13 to couple the two fittings. Connector element 13 has indentations 15 on the inner surface of lip 16. An opening 17 leads to the longer diameter bore 18.

Fitting 14 has a male connector element 19 with a dually tapered flange 20. Connector element 19 is trifurcated by slots 20a. Slots 20a are wide enough to enable flange 20 to bend inwardly and pass through opening 17 when pressure is applied to force flexible connector element 19 through opening 17. A reverse pressure also forces the tip of connector element 19 inwardly and allows retraction of connector element 19.

Fitting 14 also has a hollow barrel 21 terminated by retaining ring 22 and teeth 23 which fit into indentations 15 to prevent rotation of fittings 11 and 14 with respect to each other. Barrel 21 has internal lands 24 and grooves 26 for connection to an extension handle.

Figure 2:
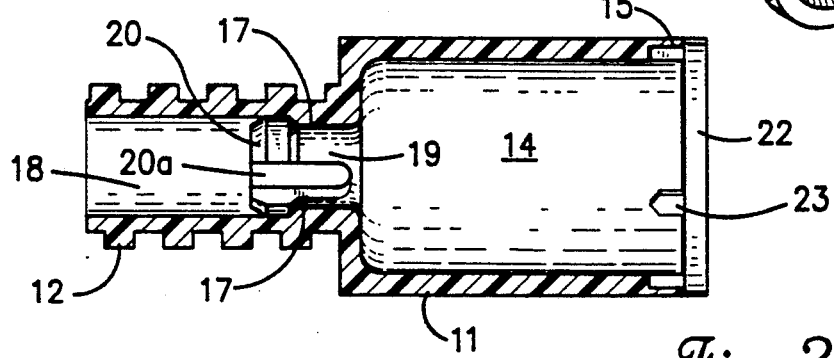
FIG. 2 is a section of the mated components of FIG. 1.

FIG. 2 shows mated fittings 11 and 14 of FIG. 1 with their complementary shaped and precisely sized connector elements.

Figure 3:
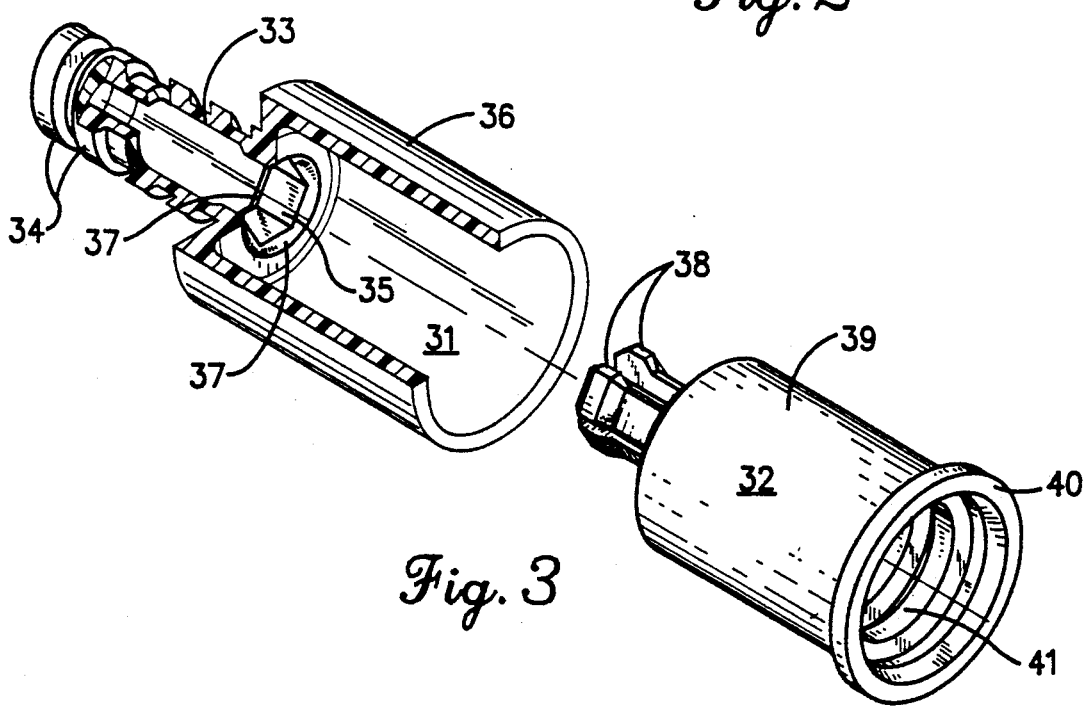
FIG. 3 is a partially cutaway view of a second embodiment.

FIG. 3 pictures an embodiment of a window washing squeegee handle/extension coupler with fittings 31 and 32. Fitting 31 has, at one end, a hollow attachment element 33 with threads 34. Attachment element 33 terminates in a hexagonal opening 35 at the center of connector base 36. The edges 37 of opening 35 are tapered to facilitate the seating and withdrawal of the cruciform slotted, hexagonal connector element 38. At the other end of the fitting 32 is a hollow bore 39 having a retaining ring 40 and internal threads 41.

Figure 4:
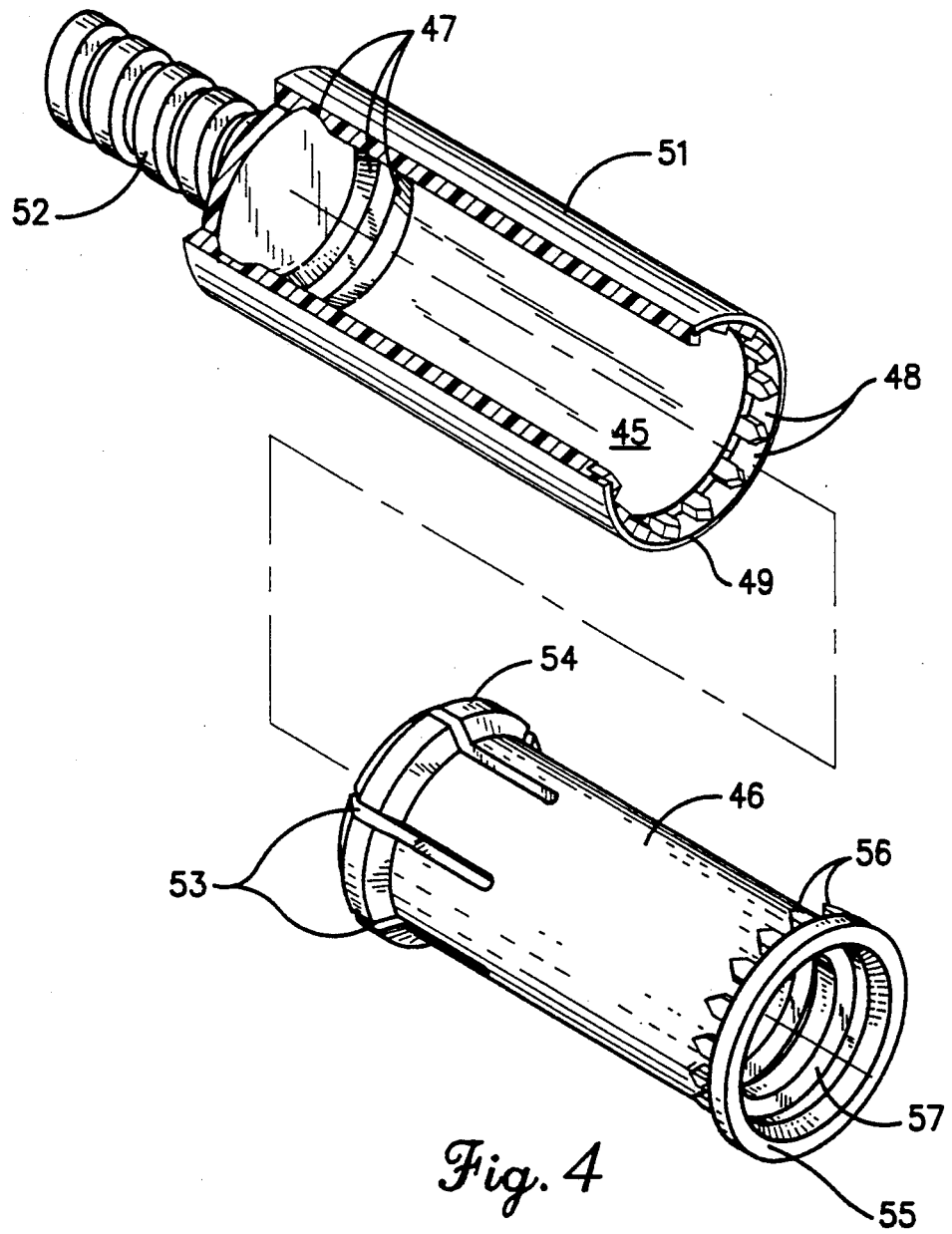
FIG. 4 is a partially cutaway view of a third embodiment.

FIG. 4 is a view of fittings 45 and 46 of a third embodiment. This embodiment has a channel 47 at one end and indentations 48 on the inner portion of lip 49 at the other end. Female connector 51 is capped by an externally threaded male connector element 52. Fitting 46 has slots 53 and a flange 54 with dually tapered sides at one end and a retainer ring 55 with external teeth 56 and internal threads 57.

GENERAL DESCRIPTION OF THE INVENTION

The tools with which the couplings can be used additionally include sanding tools, brooms, light bulb removers, etc. The couplers are preferably made of a slightly flexible plastic such as a polyformal, polyester or polyamide. The couplers have unexpectedly great resistance to stresses. Thus, a Derlin coupler of the type depicted in FIGS. 1 and 2 having the diameter of a commercial expansion handle attached to a roller handle frame and an expansion handle remains unbroken when the expansion handle breaks from a lateral stress. While the Figures depict only embodiments with a round external geometry, other shapes can be utilized, e.g., hexagonal and octagonal.

The attachment elements are preferably threaded as indicated in the Figures but the threaded elements can be tapered to be complementary, i.e., similar in shape and size to some commercial devices.

The connector elements can have many forms, as indicated by the Figures. Common to all, however, is a slotted flange (enlargement) portion of the male connector element which is tapered on each side to form, in section a truncated triagle or cone or half of an ellipse or oval. The dual taper is required to enable the user to insert and retract the male connector element into a seated position within the female connector element. The flange is preferably at the end of the male member but can be imtermediate the male member. In any event, it must be spaced apart from the centered opening for obvious reasons. The slots in the male connector element will be, practically, longitudinal but can be angled, spiraled, etc. These modifications are intended to be included within the term "longitudingal". Further, while the flange and the complementary channel of the female connecting element are shown as being continuous, the absence of a portion of each can be utilized as an alignment mechanism to prevent rotation of the fittings with respect to each other or for other purposes. Finally, the size of the coupler used will mirror that of the tools and extensions being worked. The couplers and their component parts must be able to withstand distresses provided by use in the workplace.

The connector elements should be complementary to the extent that there is little, if any, movement of the fittings with respect to each other.

I claim:

1. A quick release coupling for tools and extension handles consisting essentially of two single piece fittings, one fitting having an externally threaded male element for screwed in connection to a threaded female element of a tool and the other fitting having an internally threaded element for screwed on connection to a threaded male element of an extension handle, one of the fittings additionally having a female connector element which has channel means for receiving a male connector element and the other of the fittings additionally having a flexible, longitudinally slotted male connector element with dually tapered flange means on its outer surface for seating in the channel means of the female connector element, the two connector elements being substantially complementary in shape and size to prevent substantial longitudinal movement of the fittings relative to each other when the male connector element is seated within the female connector.

2. The coupler of claim 1 wherein one fitting additionally includes teeth and the other fitting additionally includes complementary indentiations for the prevention of rotation of the fittings relative to one another.

3. The coupler of claim 1 wherein one fitting includes an opening and an adjacent channel of greater size and where the enlargement of the male coupler element means, the opening and the channel of the female coupler element means have complementary noncircular geometric shapes to prevent the fittings from rotating relative to each other.

* * * * *